(12) United States Patent
Schubert (10) Patent No.: US 9,979,480 B1
(45) Date of Patent: May 22, 2018

(54) OPTICAL POWER AND DATA

(71) Applicant: X Development LLC, Mountain View, CA (US)

(72) Inventor: Martin F. Schubert, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days. days.

(21) Appl. No.: 15/159,014

(22) Filed: May 19, 2016

(51) Int. Cl.
*H04B 10/25* (2013.01)
*H04B 10/40* (2013.01)

(52) U.S. Cl.
CPC ......... *H04B 10/2503* (2013.01); *H04B 10/40* (2013.01); *H04B 10/2504* (2013.01)

(58) Field of Classification Search
CPC . H04B 10/2503; H04B 10/2504; H04B 10/40
USPC ........................................................ 398/142
See application file for complete search history.

(56) References Cited

U.S. PATENT DOCUMENTS

| 6,031,648 | A  | * | 2/2000 | Javitt | H04B 10/60 398/119 |
| 7,359,647 | B1 | * | 4/2008 | Faria | H02J 17/00 398/113 |
| 8,180,225 | B2 | * | 5/2012 | Werthen | G06F 13/385 398/135 |
| 9,325,206 | B2 | * | 4/2016 | Chan | H02J 17/00 |
| 2006/0018661 | A1 | * | 1/2006 | Green | H04B 10/1127 398/128 |
| 2008/0166133 | A1 | * | 7/2008 | Hsiao | H04B 10/807 398/168 |
| 2010/0290787 | A1 | * | 11/2010 | Cox | H04B 10/808 398/115 |
| 2013/0039654 | A1 | * | 2/2013 | Park | H04B 10/40 398/41 |
| 2014/0270800 | A1 | * | 9/2014 | Masarik | H04B 10/2503 398/131 |
| 2015/0249833 | A1 | * | 9/2015 | Tourapis | H04N 19/154 375/240.03 |
| 2017/0139238 | A1 | * | 5/2017 | Abouraddy | G02F 1/21 |

FOREIGN PATENT DOCUMENTS

| EP | 0344881 A2 * 12/1989 | G02B 13/16 |
| WO | WO 2008/080071 A1 7/2008 | |
| WO | WO 2012134992 A2 * 10/2012 | B32B 17/10669 |

OTHER PUBLICATIONS

Power Over Fiber, LaserMotive, accessed Apr. 25, 2016, 2 pages.

* cited by examiner

*Primary Examiner* — Dalzid Singh
(74) *Attorney, Agent, or Firm* — Christensen O'Connor Johnson Kindness PLLC (57) ABSTRACT

A system of optical power and data transfer includes an optical emitter to emit a data signal and a power signal along a common path. The system also includes a demultiplexer coupled to receive the data signal and the power signal, where the demultiplexer includes a first output coupled to output the data signal and a second output coupled to output the power signal. An optical receiver is optically coupled to the first output to receive the data signal and convert the data signal into electrical data. A power converter is optically coupled to the second output to receive the power signal and to convert the power signal into electrical power to power operation of other circuitry.

19 Claims, 8 Drawing Sheets

OPTICAL POWER AND DATA

TECHNICAL FIELD

This disclosure relates generally to optics, and in particular but not exclusively, relates to power and data transfer.

BACKGROUND INFORMATION

Light guiding via refraction was first demonstrated in the 1840's. One seminal experiment demonstrated that light directed into a parabolic stream of water is totally reflected by the water's surface. Thus, light entering the stream of water does not exit the stream of water, and instead remains culminated in the stream even when the stream bends.

These early experiments gave rise to our understanding of total internal reflection. When light traveling in a dielectric hits a boundary at an angle (larger than the critical angle) the light is totally reflected. This effect is used in many optical devices today, and governs many communications technologies.

One implementation of light guides/total internal reflection is the optical fiber. An optical fiber generally is a transparent, flexible fiber made by extruding glass or plastic. Optical fibers are often used to transmit light between the two ends of the fiber. This is applicable in the field of optical communications, where optical fibers allow for higher bandwidth transmissions over longer distances than conventional wire cables. Fibers are used in lieu of metal wires because fibers suffer less loss: electron flow in metal wires may be disrupted by scattering events in the metal lattice and/or electromagnetic interference from external sources.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of an apparatus and method for optical power and data transfer are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Advanced computing technologies have increasingly large power and data input requirements. For example, in order for virtual reality display technologies to be completely immersive, screens must render data at the same bit rate and bit depth as the human eye. This requires extremely large bit-rate inputs and high resolution screens. Optical communications may be required to supply these high bit-rates due to inherent limitations of electron flow in metal wires. This disclosure provides systems and methods for optical power and data transfer using a reduced number of cables (or no cables at all).

Figure 1A:
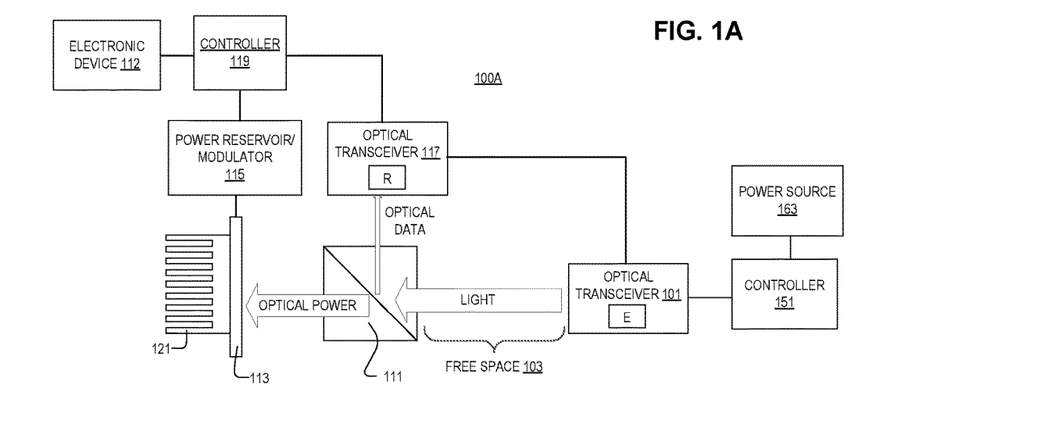
FIG. 1A illustrates a system for optical power and data transfer, in accordance with an embodiment of the disclosure.

FIG. 1A illustrates system 100A for optical power and data transfer, in accordance with an embodiment of the disclosure. System 100A includes: optical transceiver 101 (including an optical emitter "E"), controller 151, power source 163, demultiplexer 111, optical transceiver 117 (including an optical receiver "R"), power converter 113, heatsink 121, power reservoir 115, controller 119, and electronic device 112 (e.g., head mounted display, radio frequency transmitter, TV, server, etc.).

An optical emitter (included in optical transceiver 101) emits a data signal and a power signal concurrently along a common path (e.g., free space 103). Demultiplexer 111 (e.g., a beam splitter) is coupled to receive the data signal and the power signal, and separate the data signal from the power signal. An optical receiver (included in optical transceiver 117) is optically coupled to a first output of demultiplexer 111 to receive the data signal and convert the data signal into electrical data. Power converter 113 is optically coupled to a second output of demultiplexer 111 to receive the power signal and convert the power signal into electrical power to power operation of other circuitry (e.g., controller 119, electronic device 112, or the like) in system 100A. In one embodiment, power converter 113 may also function as the demultiplexer 111 (e.g., if the absorption edge of power converter 113 is at a shorter wavelength than the data signal, so the data signal passes through power converter 113 while the power signal is absorbed). In this embodiment, it could be said that the power converter 113 is optically coupled to the second output of demultiplexer 111 to receive the power signal, since power converter 113 is demultiplexer 111.

Power converter 113 includes a photovoltaic device with an absorption maxima corresponding to a wavelength of the power signal; thus optimizing conversion of optical power to electrical power. Efficiency may be further improved if the power signal wavelength is also at the absorption onset of power converter 113 (since the intra-device voltage is highest here). One skilled in the art will appreciate that power converter 113 may include any system capable of converting photon energy into electrical energy. For example, conversion elements may be diodes, but may also include resonant structures such as coherent perfect absorbers. In the depicted embodiment, power converter 113 is coupled to heatsink 121 to dispose of waste heat generated by absorption of the power signal. As shown, heatsink 121 is a simple finned heatsink 121 which uses a large surface area to dissipate heat. However, in other embodiments a combinations of fins, fans, and/or liquid coolants may be used. In one embodiment, power converter 113 may include a photovoltaic device and a thermoelectric device, where the thermoelectric device is coupled to (and disposed between) the photovoltaic device and heatsink 121 to convert waste heat into electrical energy. It is appreciated that other enhancements to power converter 113 (like the inclusion of a thermoelectric device) may be used to increase the efficiency of system 100A.

Power converter 113 is coupled to power reservoir 115 to store and/or modulate the electrical power output from power converter 113. For example, in embodiments where the data signal is a modulation of the power signal, power converter 113 may output a non-steady-state signal. Power reservoir 115 may absorb energy contained in the raw—and possibly sporadic—waveform output from power converter 113 and transform it into a steady DC output for electronic device 112 to use. In one embodiment, power reservoir 115 includes a battery or capacitive storage devices; however, power reservoir 115 may also include inductive elements, filters, or the like.

Power reservoir 115 is coupled to controller 119. Controller 119 may control the power output to electronic device 112 from power reservoir 115. Controller 119 is also coupled to optical transceiver 117 to receive the electronic data signal, which may be altered by controller 119 or sent directly to electronic device 112.

In the depicted embodiment, the optical emitter and optical receiver are contained in optical transceiver 101 and optical transceiver 117, respectively. As illustrated, optical transceiver 101 and optical transceiver 117 may be coupled so optical transceiver 117 is capable of sending a feedback signal to optical transceiver 101 and/or controller 151. Feedback information may be sent via free space (i.e., through air or vacuum), or may be sent through a fiber optic or electrical cable between optical transceiver 101 and optical transceiver 117. Feedback information may be used to adjust the emission of the optical emitter in optical transceiver 101. For example, the power output from the emitter may be too high, causing power converter 113 to overheat. In this situation the feedback signal may instruct the optical emitter in optical transceiver 101 to reduce power output. In one embodiment, the receiver in optical transceiver 117 may also adjust its reflectivity to incident light at the "power wavelength"; reflected light can be monitored by optical transceiver 101. Depending on the amount of reflected light, the emitter in optical transceiver 101 may reduce or increase power output.

In one embodiment, the optical emitter in optical transceiver 101 may include one or more lasers (e.g., laser diodes). Optical transceiver 101 may emit multiple wavelengths of light where a first wavelength corresponds to the data signal and a second wavelength—which is different than the first wavelength—corresponds to the power signal. In this embodiment, the laser emitting the data signal may be a low-power laser, while the laser emitting the power signal may be a high-power laser. However, in another embodiment the laser may be a single structure capable of emitting multiple wavelengths of light. In the depicted embodiment, optical emitter is configured to emit the data signal and the power signal simultaneously.

Figure 1B:
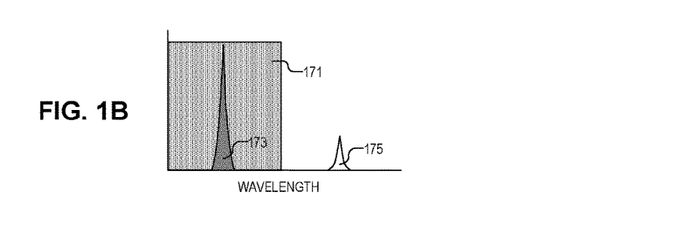
FIG. 1B is a diagram illustrating operation of the system in FIG. 1A, in accordance with an embodiment of the disclosure.

FIG. 1B is a diagram illustrating operation of the system in FIG. 1A, in accordance with an embodiment of the disclosure. It is worth noting that the X-axis depicts wavelength, and the Y-axis is arbitrary intensity units. Block 171 represents the portion of the EM spectrum transmitted by the beam splitter in FIG. 1A, emission spectrum 173 is an example emission spectrum of the power signal, and emission spectrum 175 is an example emission spectrum of the data signal. As shown, in FIG. 1A the power signal emission spectrum 173 has a wavelength that the beam splitter transmits with minimal losses; conversely, the data signal has a wavelength that the beam splitter reflects with minimal losses. However, one skilled in the art will appreciate that the power signal and the data signal may be reversed (i.e., the power signal is reflected, while the data signal is transmitted) depending on design considerations such as heating of the beam splitter and losses at certain wavelengths. Furthermore, the relative distances between wavelengths of emission, transmission, and reflection events may be different in an actual device since FIG. 1B depicts highly simplified/idealized version of the optical processes in system 100A.

Figure 1C:
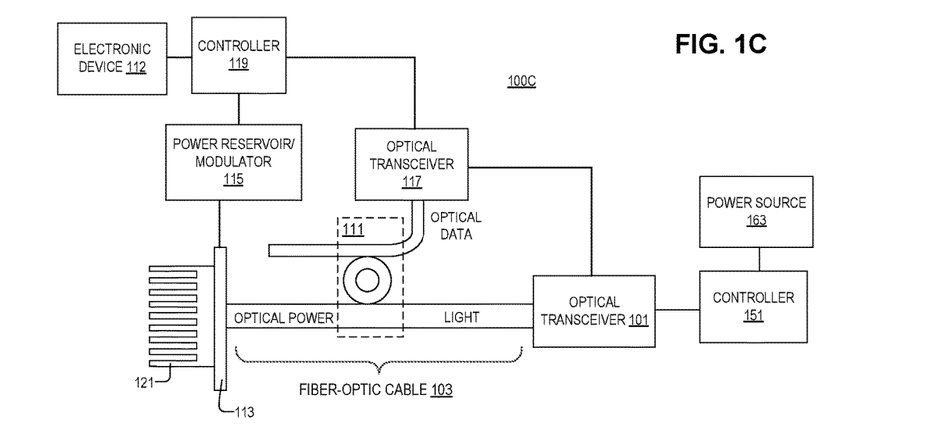
FIG. 1C illustrates a system for optical power and data transfer, in accordance with an embodiment of the disclosure.

FIG. 1C illustrates system 100C for optical power and data transfer, in accordance with an embodiment of the disclosure. System 100C is similar in many respects to system 100A in FIG. 1A. However, system 100C uses a ring resonator in demultiplexer 111, and fiber-optic cable 203 is optically coupled to the optical emitter (included in optical transceiver 101) and the demultiplexer 111.

The data signal and power signal are emitted by optical transceiver 101, and travel through fiber-optic cable 103. In the depicted embodiment, the data signal and power signal have two separate wavelengths. In one embodiment, fiber optic cable may be plastic or glass and may have external cladding to improve efficiency. Once the data signal and the power signal reach demultiplexer 111, the data signal is separated from the power signal since the frequency of the data signal corresponds to the resonant frequency of the ring resonator. Although the illustrated embodiment shows a single ring resonator, double ring resonators may be used to separate the signals, along with other techniques such as band-pass filtering and or like. The data signal exits the ring resonator and is transferred via fiber optic cable to optical transceiver 117, which converts the optical data signal into an electrical data signal. Conversely, the power signal continues along fiber-optic cable 103 to power converter 113.

In one embodiment, multiple electronic devices 112 (including multiple demultiplexers 111, power converters 113, optical transceivers 117, etc.) are coupled to fiber-optic cable 103. This allows multiple devices to have access to power and data through a single fiber-optic cable 203. For example, multiple RF access points (see infra FIG. 2D) may be coupled along a single strand of optical fiber to receive power and data. Other kinds of devices—not just RF access points—may be strung together in a similar manner.

Figure 1D:
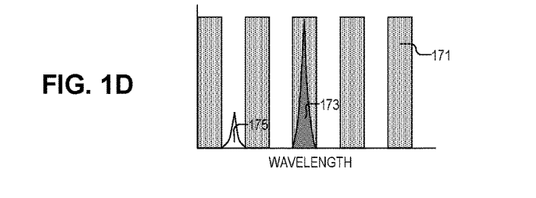
FIG. 1D is a diagram illustrating operation of the system in FIG. 1C, in accordance with an embodiment of the disclosure.

FIG. 1D is a diagram illustrating operation of the system in FIG. 1C, in accordance with an embodiment of the disclosure. It is worth noting that the X-axis depicts wavelength, and the Y-axis is arbitrary intensity units. Block 171 represents the portion of the EM spectrum transmitted by the ring resonator in FIG. 1C (i.e., the portion of the optical signal that continues straight along its original path), emission spectrum 173 is an example emission spectrum of the power signal, and emission spectrum 175 is an example emission spectrum of the data signal. As shown, the power signal emission spectrum 173 lies squarely in the middle of block 171 and therefore travels directly to power converter 113; conversely, the data signal emission spectrum 175 is outside of blocks 171 (i.e., emission spectrum 175 falls into a resonant frequency of ring resonator) and travels around the center loop of the ring resonator to optical transceiver 117. However, one skilled in the art will realize that the power signal and the data signal may be reversed (i.e., the power signal is diverted, while the data signal is transmitted) depending on design considerations such as heating of the ring resonator and losses at certain wavelengths. Furthermore, the relative distances between wavelengths of emission, transmission, and reflection events may be different in an actual device since FIG. 1D depicts highly simplified/idealized version of the optical processes in system 100C.

Figure 1E:
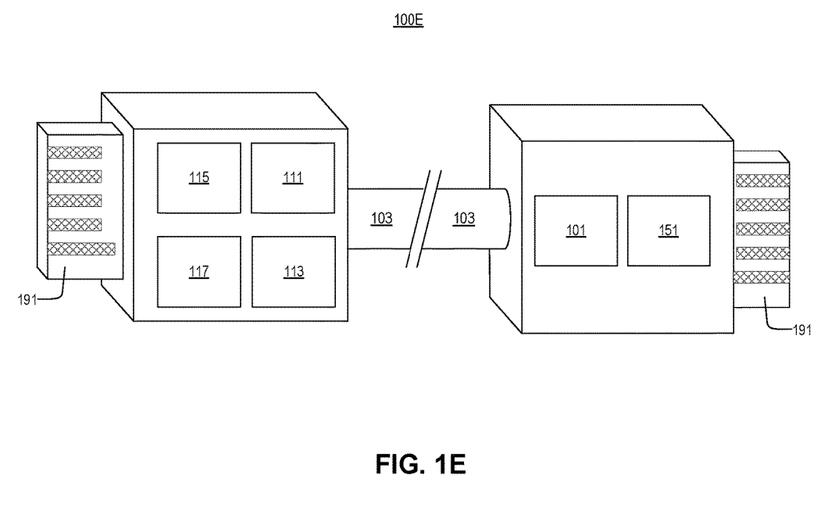
FIG. 1E illustrates a system for optical power and data transfer, in accordance with an embodiment of the disclosure.

FIG. 1E illustrates system 100E for optical power and data transfer, in accordance with an embodiment of the disclosure. System 100E is similar to the systems depicted in FIGs. 1A & 1C; however, system 100E is encapsulated and shows one potential commercial embodiment of the disclosure.

As illustrated system 100E includes: optical transceiver 101, controller 151, fiber-optic cable 103, demultiplexer 111, power converter 113, power reservoir 115, optical transceiver 117, and electrical contacts 191. Other components from FIGS. 1A & 1C may be present in, or absent from, system 100E—depending on which components are disposed in system 100E, and which components are disposed in the device that system 100E is powering. For example, system 100E may not need power source 163 (see e.g., FIG. 1A) because one end of system 100E plugs into a device with a power source. Similarly, system 100E may not need controller 119 (see e.g., FIG. 1A) because one end of system 100E plugs into a device with its own controller/processor. One skilled in the art will appreciate that the components in this disclosure may be distributed between any number of electronic devices, in accordance with the teachings of the present disclosure.

In the illustrated embodiment, all electrical components are fully assembled into a cable/power supply cord, and encapsulated in a polymeric material or the like. System 100E may be a general purpose cord designed to plug into ubiquitous sockets (such as a wall socket or USB-type ports), or may be specific to individual devices. The right-hand side of the cord receives a power and data stream with controller 151 from an external device. Controller 151 instructs optical transceiver 101 to output a power and data signal. The power and data signal are then sent along fiber-optic cable 103 and received by demultiplexer 111 which separates the power and data signals. The power signal is received by power converter 113 (which converts the optical power signal into electrical power), and the data signal is received by optical transceiver 117 (which converts the data signal into electrical data). The electrical power is then transferred into power reservoir 115 which may store and/or modulate the power so it is suitable for use by an electronic device (such as a screen, head-mounted display, radio frequency emitter, or the like). Here, the right electrical contact 191 may be plugged into a device with a controller/processor configured to receive the specific electrical power and data signals output from system 100E.

Although not depicted, optical transceiver 117 may send a feedback signal to optical transceiver 101 along fiber-optic cable 103, or a different fiber-optic cable in a bundle with fiber-optic cable 103. This may allow for greater control of the power and data signal supplied by system 100E.

Figure 2A:
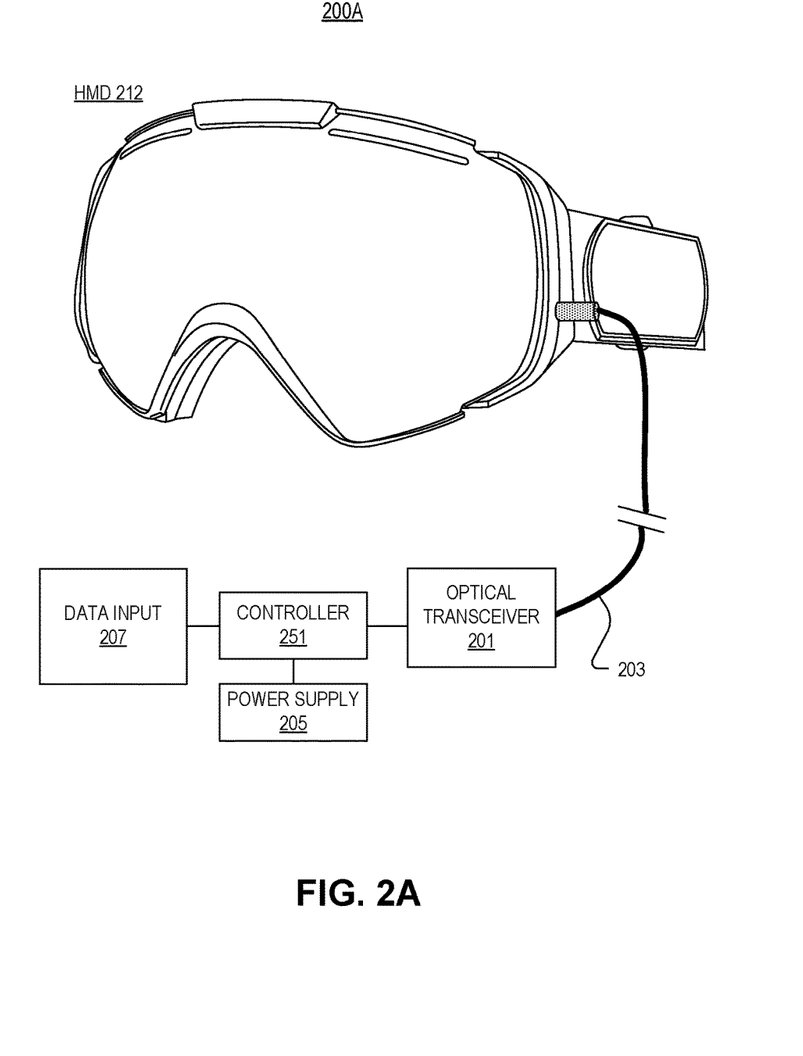
FIG. 2A illustrates a power and data system for a head-mounted display, in accordance with an embodiment of the disclosure.

FIG. 2A is a power and data system 200A for head-mounted display (HMD) 212, in accordance with an embodiment of the disclosure. As shown HMD 212 includes a display system that covers the user's entire field of view, to give the user a truly immersive virtual reality experience. The display system may require a very high bandwidth input to render high-resolution scenes. Accordingly, optical data input is necessary. To enhance the user's range of motion while wearing HMD 212 only a single cable is used delivering both optical data and power.

System 200A may use all or some of the components discussed in connection with FIGS. 1A-1E. In the depicted embodiment, HMD 212 is coupled to an optical transceiver 201 (including an optical emitter) which sends HMD 212 both an optical data signal and an optical power signal via fiber-optic cable 203. Optical transceiver 201 is controlled by controller 251, which receives power from power supply 205, and data from data input 207.

An optical emitter (included in optical transceiver 201) is used to emit an optical data signal and an optical power signal. An optical receiver (disposed in HMD 212 or at the end of fiber-optic cable 203) is optically coupled to the optical emitter to receive the data signal and convert the optical data signal into electrical data. A power converter is also optically coupled to receive the power signal and convert the power signal into electrical power to power the HMD. In one embodiment, the power converter is a photovoltaic device with an absorption maxima corresponding to the wavelength of the power signal. In some embodiments, the data signal may be a modulation of the power signal, or the data signal and power signal may have two separate wavelengths. In one embodiment, a demultiplexer is coupled to receive the data signal and the power signal from fiber-optic cable 203, and the demultiplexer outputs the data signal to the optical receiver disposed in HMD 212, and outputs the power signal to the power converter disposed in HMD 212.

One skilled in the art will appreciate that the data signal may include a high-resolution video feed, audio feed, graphics rendering input, operational instructions, or the like. Further, HMD 212 may include see-through screes to facilitate a heads-up display (HUD).

Figure 2B:
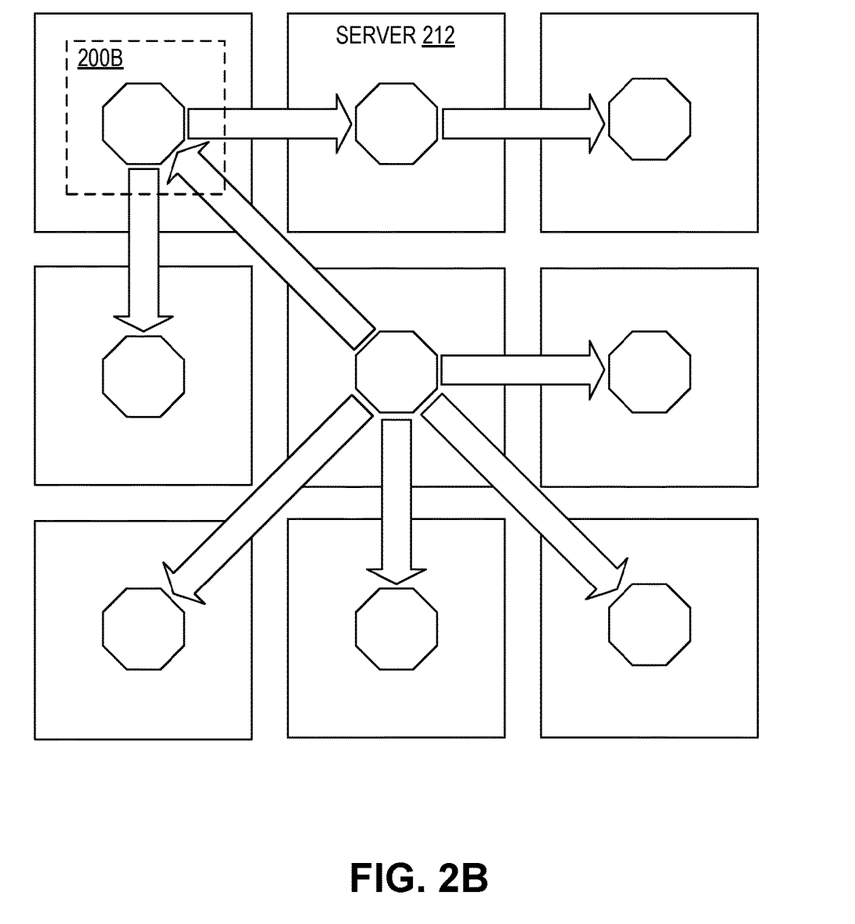
FIG. 2B illustrates a power and data system for data centers, in accordance with an embodiment of the disclosure.

FIG. 2B illustrates power and data system 200B (which may include all or some of system 100A, 100C, or 100E in FIGS. 1A, 1C & 1E, respectively) adapted for data centers, in accordance with an embodiment of the disclosure. The depicted embodiment shows a top-down view of nine server stacks 212. The server stacks 212 each have system 200B mounted on top of server stacks 212. As shown, each system 200B has eight optical transceivers to send power and data (depicted as arrows) to other server stacks 212. Traditional data centers require a large number of cables/outlets to power all of the server stacks. The configuration shown here may allow large data centers to supply power and data to all servers with minimal installation costs (by virtue of having few or no wires/cables). Furthermore, system 200B may be placed high-above individual server stacks 212 so the power and data signals are well above technicians working in the data center. Alternatively, system 200B may be placed under the floor of the data center which also allows technicians to work freely on server stacks 212.

Although the depicted embodiment shows that the power and data signals are transmitted wirelessly, in other embodiments, fiber optic cables may be employed which still greatly limit the number of cables used in any given data center. Furthermore, while FIG. 2B shows only nine server stacks 212 arranged in a grid pattern, in other embodiments hundreds of sever stacks 212 may be arranged as shown, or in any other configuration that facilitates communications between server stacks 212. System 200B may be configured to have any number of transceivers depending on the configuration of server stacks 212, or may be designed to rotate when communication with another server stack 212 is required.

Figure 2C:
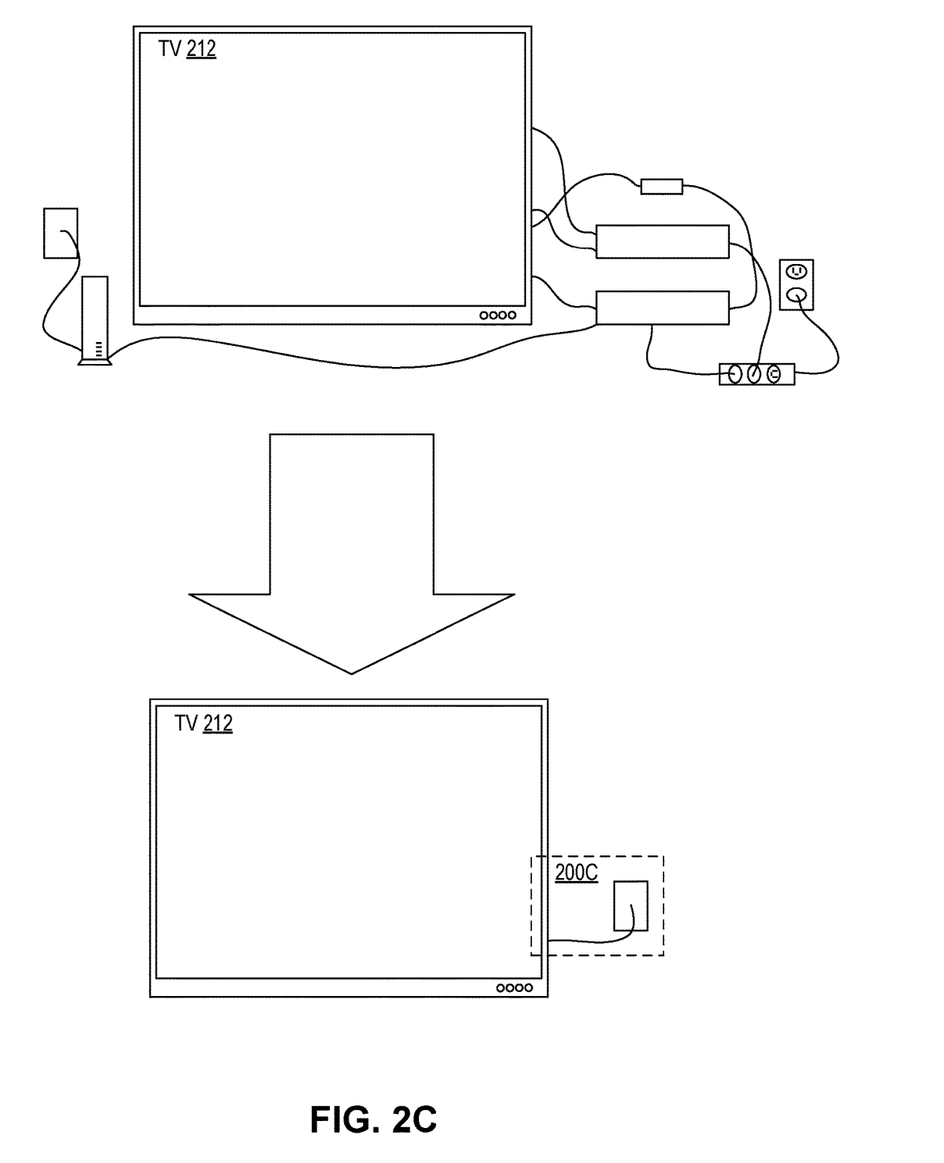
FIG. 2C illustrates a power and data system for home use, in accordance with an embodiment of the disclosure.

FIG. 2C illustrates a power and data system 200C for home use, in accordance with an embodiment of the disclosure. System 200C may use all or some of the components discussed in connection with FIGS. 1A-1E.

The top figure is an example of a home entertainment setup littered with cables, power adapters, and converters because TV 212 receives power and data from multiple locations. This is not ideal due to the complexity of setup, lack of aesthetic appeal, and potential fire hazard caused by the plethora of cables.

The bottom figure shows a home entertainment setup that is greatly simplified using system 200C, which outputs both power and data to TV 212 from a single cable. By using a single cable to transfer both power and data to TV 212, clutter is drastically reduced.

Figure 2D:
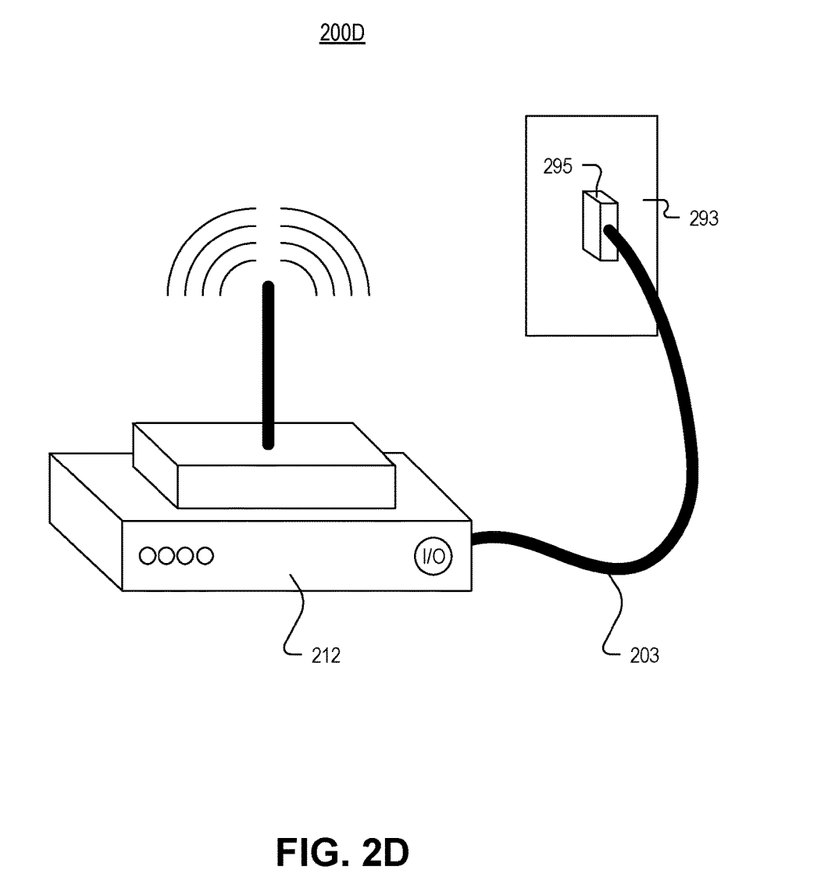
FIG. 2D illustrates a power and data system for a radio frequency emitter, in accordance with an embodiment of the disclosure.

FIG. 2D illustrates a power and data system 200D for a radio frequency (RF) emitter/receiver, in accordance with an embodiment of the disclosure. System 200D may use all or some of the components discussed in connection with FIGS. 1A-1E. As shown optical power and data may either be extracted from the wall socket 293 (e.g., if an optical transceiver is disposed in wall socket 293), or may be derived from power/data extracted from the wall socket (e.g., if an optical transceiver and controller are disposed in plug 295). The optical power/data is directed through fiber-optic cable 203, demultiplexed, and converted into electrical data and power signals (see e.g., FIGS. 1A-1E). The electrical power signal is then used to power radio-frequency emitter/receiver 212. The electrical data signal may be used to control RF emitter/receiver 212 or may even be broadcast by RF emitter/receiver 212. Furthermore, RF emitter/receiver 212 may send communications back to wall socket 293 via fiber-optic cable 203.

In one embodiment, RF emitter/receiver 212 may be a wireless access point which benefits from the ultra-high optical data transfer rates. The wireless router may include: one or multiple wireless network interface controllers, circuitry enabling RF transmission of anywhere from 2-10 GHz, circuitry enabling data transfer rates in the range of hundreds of megabits to gigabits per second, Bluetooth connectivity, or the like. However, one of ordinary skill in the art will appreciate that this list is not exhaustive, and many technologies may be incorporated into RF emitter/receiver 212.

Figure 3:
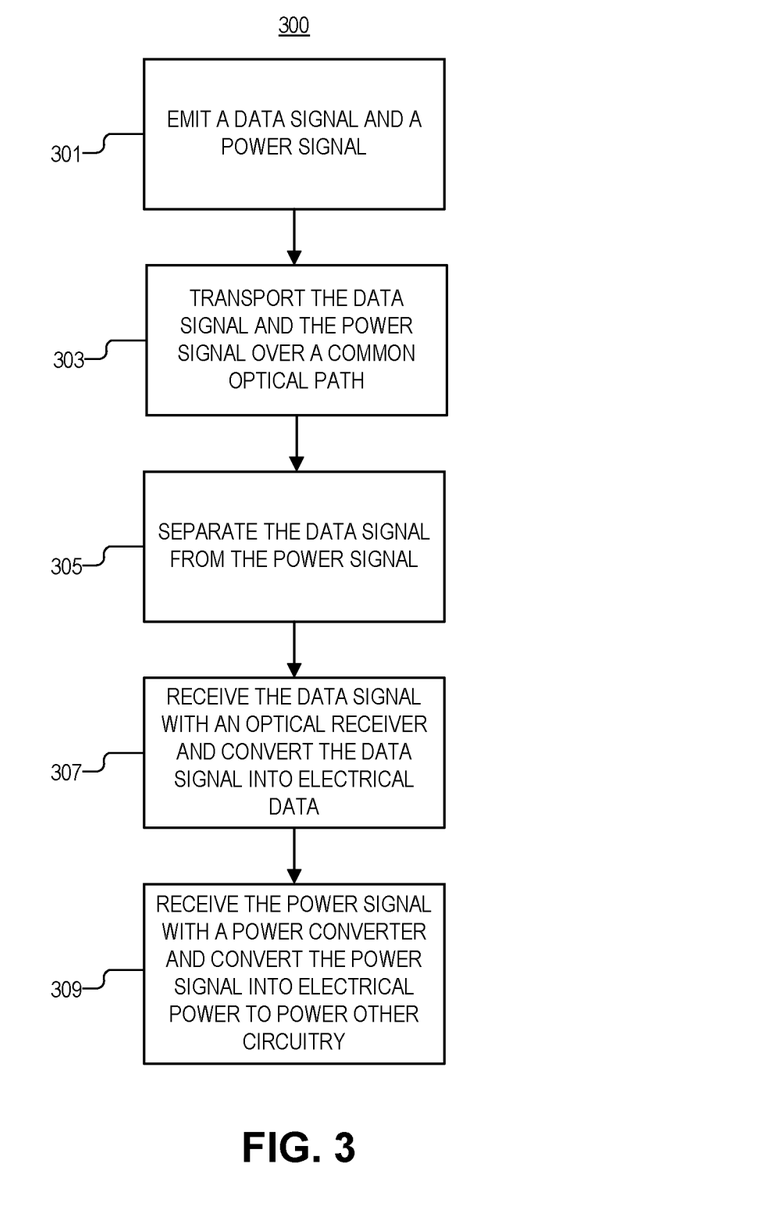
FIG. 3 is a flow chart illustrating a method of optical power and data transfer, in accordance with several embodiments of the disclosure.

FIG. 3 is a flow chart illustrating a method 300 of optical power and data transfer, in accordance with several embodiments of the disclosure. The order in which some or all of process blocks 301-309 appear in method 300 should not be deemed limiting. Rather, one of ordinary skill in the art having the benefit of the present disclosure will understand that some of method 300 may be executed in a variety of orders not illustrated, or even in parallel.

Block 301 shows emitting a data signal and a power signal. The data signal and the power signal are concurrent optical signals. In one embodiment, one or more laser diode emitters may be used to generate the power signal and the data signal. However, in some embodiments, other lasing devices/systems may be used including Nd:glass laser amplifiers, yttrium-aluminum-garnet lasers, $CO_2$ lasers, or the like. Laser light emitted may be anywhere on the electromagnetic spectrum conducive to power and data transfer, taking into consideration things like the atmospheric absorption spectrum (when transferring data/power through space), absorption spectra of glass/plastic (when transferring data/power through an optical fiber), and absorption spectra of the power converter (if the power converter is a photovoltaic device), and the like.

Block 303 illustrates transporting the data signal and the power signal over a common optical path. In one embodiment, transporting the data and power signal may include multiplexing the data signal and the power signal and sending the data/power signal through a fiber-optic cable or free space.

Block 305 discloses separating the data signal from the power signal. This may include demultiplexing the data signal from the power signal. Demultiplexing may be achieved by any optical demultiplexing system including ring resonators, beam splitters, band-pass filters, or the like.

Block 307 shows receiving the data signal with an optical receiver and converting the data signal into electrical data (after the power and data signals are demultiplexed). Conversion of the optical data signal into an electrical data signal may be accomplished using semiconductor diodes or other optical-to-electrical conversion methods. Furthermore the electrical signal may be used as a binary signal, analog signal, or both binary and analog signal depending on the information to be gleaned from the optical data signal.

Block 309 illustrates receiving the power signal with a power converter, and converting the power signal into electrical power to power other circuitry. Converting the optical power signal to an electrical power signal may be achieved with a photovoltaic device optimized to receive the wavelength(s) of the power signal. A person skilled in the art will realize that the power signal may include one, or more than one, wavelength of light in order to optimize energy harvested by the power converter.

The power converter may be coupled to other pieces of circuitry to modulate/smooth the electrical signal generated by the optical power signal, or other devices to store the electrical power. For example, the power converter may be coupled to inductive or capacitive devices to create a DC current; alternatively, the power converter may be coupled to devices to make an AC waveform or other custom waveform depending on the power transfer application.

In one embodiment, method 300 may be extrapolated to include a system with multiple devices all receiving power and data through a single fiber optic cable. A fraction of the power could be tapped by one device, along with a particular wavelength of light transmitting data for that specific device.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A system of optical power and data transfer, comprising:
   an optical emitter included in a first optical transceiver to emit a data signal and a power signal concurrently along a common path;
   a demultiplexer coupled to receive the data signal and the power signal, wherein the demultiplexer includes a first output coupled to output the data signal and a second output coupled to output the power signal;
   an optical receiver included in a second optical transceiver and optically coupled to the first output to receive the data signal and convert the data signal into electrical data, wherein the second optical transceiver is coupled to the first optical transceiver to send a feedback signal to the first optical transceiver to increase or decrease a power of the power signal output from the optical emitter;
   a power converter including a photovoltaic device having an absorption onset at a wavelength of the power signal, wherein the power converter is optically coupled to the second output to receive the power signal and to convert the power signal into electrical power to power operation of other circuitry;
   a thermoelectric device coupled to the photovoltaic device to covert waste heat generated by the photovoltaic device into the electrical power; and
   a heatsink coupled to the thermoelectric device so that the thermoelectric device is disposed between the photovoltaic device and the heatsink.

2. The system of claim 1, further comprising a power reservoir coupled to receive the electrical power from the power converter and to store at least a portion of the electrical power.

3. The system of claim 1, wherein the optical emitter includes one or more laser diodes, wherein the power signal has a different wavelength than the data signal.

4. The system of claim 1, further comprising a fiber-optic cable optically coupled to the optical emitter and the demultiplexer, and wherein the common path extends within the fiber-optic cable.

5. The system of claim 1, wherein the optical emitter is configured to send the data signal and the power signal to the demultiplexer through free space.

6. The system of claim 1, wherein the demultiplexer includes a ring resonator.

7. The system of claim 1, wherein the photovoltaic device has an absorption maxima corresponding to the wavelength of the power signal.

8. The system of claim 1, further comprising a controller coupled to the optical receiver to receive the electrical data from the optical receiver, and coupled to the power converter to be powered by the electrical power.

9. The system of claim 1, wherein the photovoltaic device includes one or more coherent perfect absorbers.

10. The system of claim 1, wherein the heatsink includes at least one of one of fins, fans, or liquid coolants.

11. A method of optical power and data transfer, comprising:
    emitting a data signal and a power signal with a first optical transceiver, wherein the data signal and the power signal are concurrent optical signals;
    transporting the data signal and the power signal over a common optical path to a head-mounted display;
    separating the data signal from the power signal;
    receiving the data signal with an optical receiver included in a second optical transceiver and converting the data signal into electrical data to display an image on the head-mounted display, wherein the data signal has a bit rate and a bit depth that is the same or greater than a human eye can process;
    receiving the power signal with a power converter and converting the power signal into electrical power to power other circuitry in the head-mounted display, wherein the power converter includes a photovoltaic device having an absorption onset at a wavelength of the power signal; and
    sending a feedback signal from the second optical transceiver to the first optical transceiver to increase or decrease a power of the power signal output from the first optical transceiver.

12. The method of claim 11, wherein transporting and separating the data signal and the power signal includes:
    optically multiplexing the data signal and the power signal;
    sending the data signal and the power signal through a fiber-optic cable; and
    optically demultiplexing the data signal and the power signal prior to receiving the data signal with the optical receiver, and prior to receiving the power signal with the power converter.

13. The method of claim 11, wherein transporting and separating the data signal and the power signal includes:
    optically multiplexing the data signal and the power signal;
    sending the data signal and the power signal through free space; and
    optically demultiplexing the data signal and the power signal prior to receiving the data signal with the optical receiver, and prior to receiving the power signal with the power converter.

14. A power and data system for a head-mounted display, comprising:
    an optical emitter included in a first optical transceiver to emit a data signal and a power signal, wherein the data signal and the power signal are optical signals;
    an optical receiver included in a second optical transceiver disposed in the head-mounted display and optically coupled to the optical emitter to receive the data signal and convert the data signal into electrical data, wherein the second optical transceiver is coupled to the first optical transceiver to send a feedback signal to the first optical transceiver to increase or decrease a power of the power signal output from the optical emitter, wherein the data signal has a bit rate and a bit depth that is the same or greater than a human eye; and
    a power converter optically coupled to receive the power signal and convert the power signal into electrical power to power the head-mounted display, wherein the power converter includes a photovoltaic device having an absorption onset at a wavelength of the power signal.

15. The power and data system of claim 14, wherein the optical emitter is configured to emit the data signal and the power signal at the same time, and wherein the power signal has a different wavelength than the data signal.

16. The power and data system of claim 14, further comprising a fiber-optic cable optically coupled between the optical emitter and the optical receiver to transfer the data signal from the optical emitter to the optical receiver.

17. The power and data system of claim 16, further comprising a demultiplexer coupled to receive the data signal and the power signal from the fiber-optic cable, wherein the demultiplexer includes a first output coupled to output the data signal to the optical receiver and a second output coupled to output the power signal to the power converter.

18. The power and data system of claim 14, wherein the optical receiver is configured to electrically couple to a display element in the head-mounted display, and wherein the electrical data includes a video feed that produces images on the display element.

19. The power and data system of claim 14, wherein the photovoltaic device has an absorption maxima corresponding to the wavelength of the power signal.

* * * * *